United States Patent [19]

Forrestall et al.

[11] 4,283,070
[45] Aug. 11, 1981

[54] RECUMBENT BICYCLE

[75] Inventors: Richard J. Forrestall, Wilmington; David G. Wilson, Cambridge, both of Mass.

[73] Assignee: Fomac, Inc., Wilmington, Del.

[21] Appl. No.: 107,348

[22] Filed: Dec. 26, 1979

[51] Int. Cl.³ .................. B62K 17/00; B62K 21/18
[52] U.S. Cl. .............................. 280/274; 280/220; 280/266; 280/281 LP
[58] Field of Search ............ 280/281 R, 281 LP, 261, 280/266, 274, 220, 226 R, 282

[56] References Cited

U.S. PATENT DOCUMENTS

| | | | |
|---|---|---|---|
| 690,733 | 1/1902 | Jarvis | 280/261 |
| 3,429,584 | 2/1969 | Hendricks | 280/261 |
| 3,666,035 | 5/1972 | Dudouyt | 180/74 |
| 3,753,577 | 8/1973 | Robinson | 280/261 |
| 4,108,460 | 8/1978 | Silva, Jr. | 280/281 LP |
| 4,198,072 | 4/1980 | Hopkins | 280/281 LP |

FOREIGN PATENT DOCUMENTS

| | | | |
|---|---|---|---|
| 103479 | 3/1938 | Australia | 280/281 LP |
| 778585 | 3/1935 | France | 280/281 LP |
| 1288382 | 9/1972 | United Kingdom | 280/282 |

OTHER PUBLICATIONS

"The Boneshaker", *Southern Veteran Cycle Club*, Winter 1972, No. 69, vol. 7, pp. 227–244.
"Ideas and Inovation", *Bicycling Magazine*, Oct. 1978, pp. 20 & 22.
"The Scene", *The Law Tribune*, Aug. 14, 1978.
"The Best of Bicycling!", Pocket Books, Mar. 1972, pp. 289–293.
*Human Power*, pp. 74, 75 & 226–231.

*Primary Examiner*—Randolph A. Reese
*Assistant Examiner*—Donn McGiehan
*Attorney, Agent, or Firm*—Schiller and Pandiscio

[57] ABSTRACT

An improved recumbent bicycle having a carriage unit comprising an improved seat assembly and handle bars. The carriage unit is adjustably mounted on the frame of the bicycle so that it is movable toward and away from the foot pedals in order to accommodate different sized riders.

19 Claims, 6 Drawing Figures

RECUMBENT BICYCLE

The present invention relates generally to bicycles and more particularly to improved recumbent bicycles.

A recumbent bicycle differs from the more conventional, present day bicycle in that the recumbent is constructed so that cyclist sits behind the pedals in a seat, usually provided with a backrest, in more of a horizontal position than the vertical position normally positioned in the conventional bicycles. Recumbents have been known as far back as the nineteenth century and have been described in the literature as well as various patents. See, for example, "The Boneshaker" a magazine published by the Southern Veteran Cycle Club, No. 69, Vol. 7, Winter 1972, pages 227-244 and the patents cited therein; "Ideas and Innovation", Bicycling Magazine, October, 1978, pages 20 and 22; "The Scene", The Law Tribune, Aug. 141978; "The Best of Bicycling"! Pocket Books, March 1972, pages 289-293; Human Power, Pages 74, 75 and 226-231.

The advantages of recumbent bicycles over "vertical" conventional bicycles are well known. The recumbent bicycles are usually safer than the more conventional bicycles because of the feet-forward riding position of the rider since the rider can brace himself or herself with his or her feet and even stay seated in head-on collision. The lower center of gravity and feet-forward riding position mean that a high degree of deceleration can be achieved without the rider being pitched forward. Some recumbents provide handle bars which extend above the legs of the rider posing possible danger to the rider. Other designs however have been provided in which the handle bars are disposed below the rider so that if the rider is thrown forward, there is a reduced chance of injury to the body due to contact with the handle bars and brakes and gear shift levers usually provided on the handle bars. Further safety is provided since the feet are positioned in front of the rider so that the feet are most likely to make contact in a head-on collision, very often bracing the rider and preventing substantial injury to him or her. Further, the low center of gravity of the rider will significantly reduce front and rear wheel skids which are more often experienced in the conventional "vertical" bicycle.

Other advantages of the recumbent design include (1) the ability to brake with both feet should it be necessary, (2) the rise of maximum braking capability because of the low center of gravity and feet forward riding position, (3) the ease by which riders can communicate with automobile drivers, (4) rider comfort allows the rider to cover greater distances with less fatigue since the spine is fully supported and the body stress line is through the hips and/or shoulders to the seat allowing the upper torso and arms to remain relaxed while full power is applied to the foot pedals or cranks, (5) less likelihood of the rider being overthrown or losing control when the rider's foot slips from the pedal during a hard thrust, (6) easier cornering since the pedals are usually high enough so that they will not hit the road when cornering, and (7) greater thrust power since the rider can brace his or her back when pushing with his or her legs and less frontal area than that of conventional bicycle reduces wind resistance.

Generally, in most recumbent designs the position of the seat is relatively fixed with respect to the pedal positions, requiring various sized frames for different sized riders. This, of course, effects the bicycle manufacturing costs as well as the inventory requirements of a bicycle supplier and retailer. Although some designs have been proposed with adjustable seats, the handle bars are disposed above the frame posing the above noted dangers to the rider. In those designs where the handle bars are disposed below the rider as noted above and directly attached for rotation in the head tube of the frame, it is necessary to locate the handle bars as closely as possible within arms length of the rider resulting in the front wheel being closer to the back wheel, i.e. a shorter wheel base, and a less stable design.

It is a general object of the present invention to provide an improved recumbent bicycle having the advantage or prior art recumbent designs, while reducing or overcoming the disadvantages of those designs.

A more specific object of the present invention is to provide an improved recumbent bicycle in which the seat-to-pedal distance is adjustable.

Another specific object of the present invention is to provide a universal-sized recumbent bicycle for substantially all riders.

And another specific object of the present invention is to provide a recumbent bicycle having a relatively long wheel base and stable design in which the handle bars are below the rider within arms reach.

Still another specific object of the present invention is to provide an improved recumbent bicycle in which the mechanical advantage of the handle bars is adjustable.

Yet another object of the present invention is to provide an improved recumbent bicycle in which the seat is easily assembled and disassembled from the frame.

These and other objects of the present invention are achieved by an improved recumbent bicycle having a carriage unit including the handle bars and the seat. The carriage unit is adjustably mounted on the frame so that it is movable towards and away from the pedals in order to accommodate different sized riders. In the preferred form of the invention the seat is easily foldable and removable from the remainder portion of the bicycle.

Other objects of the present invention will in part be obvious and will in part appear hereinafter. The invention accordingly comprises the apparatus possessing the construction, the combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

In the drawings the same numerals refer to like parts.

Figure 1:
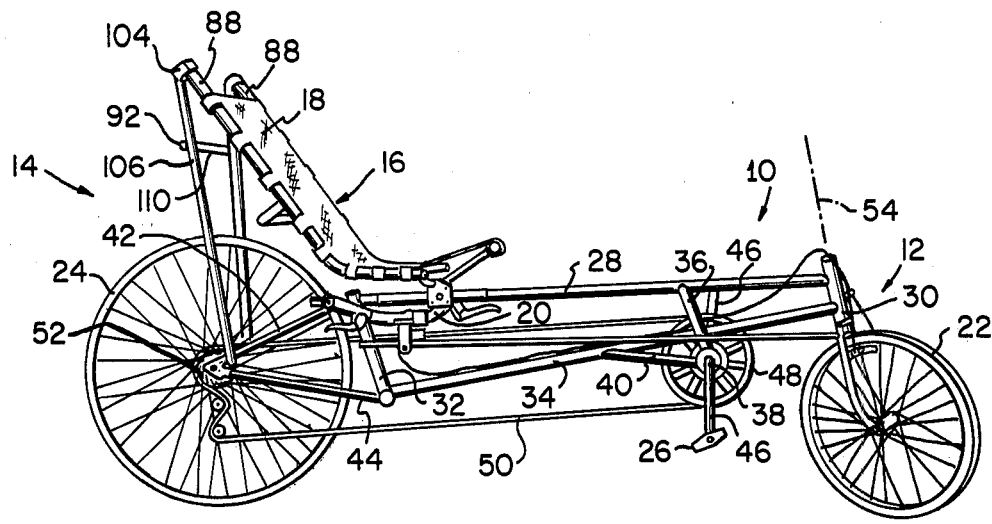
FIG. 1 shows a perspective view in side elevation of the preferred embodiment of the recumbent bicycle of the present invention.

Referring to FIG. 1, the recumbent bicycle generally includes a frame 10 including a front portion 12 and rear portion 14 and at least one elongated element extending between the front and rear portions for supporting carriage unit 16 comprising the seat assembly 18 and handle bars 20. A front wheel 22 and rear wheel 24 respectively support the front and rear portions 12 and 14 while drive means including foot pedals 26 mounted to the frame for reciprocal movement are provided for rotatably driving the rear wheel 24.

Preferably, frame 10 includes a top tube 28 extending substantially in a horizontal direction and connected at its front end to the head tube 30 and at its rear end to seat tube 32. A down tube 34 is connected from the head tube 30 in a downward direction toward the seat tube 32 below and at an angle to the top tube. A bottom bracket tube 36 is connected at one end to the top tube 28 and supports the down tube 34 at an intermediate point and terminates with a bottom bracket for rotatably supporting the bottom bracket axle 38. The frame 10 also includes a chain stay tube 40 connected at one end to the bottom bracket of the bottom bracket tube 36 and extending rearwardly where it is connected at its other end to the down tube 34.

The rear portion 14 of the frame 10 includes a pair of seat stays 42 (one of which is shown in FIG. 1) extending from the top of seat tube 32 on opposite sides of rear wheel 24 to the axle of the rear wheel, and a pair of chain stays 44 (only one of which is shown in FIG. 1) extending from the bottom of seat tube 32 on opposite sides of wheel 20 where they are connected to the ends of the seat stays. The junctions formed by the seat and chain stays 42 and 44 are suitably connected respectively to the opposite sides of the axle of rear wheel 24 so that the wheel supports the rear portion of the frame and freely rotates between the pair of seat stays and between the chain stays.

Means for rotatably driving the rear wheel 24 preferably includes the bottom bracket axle 38, which in turn supports a pair of cranks 46 respectively at opposite ends of the axle. The cranks 46 are each mounted at one end to the axle so as to rotate with the axle, and extend in diametrically opposite directions. The cranks 46 support at their other end the foot pedals 26. A sprocket gear 48 (which may or may not form a derailer as well known in the art) is suitably connected to the axle 38 for rotation therewith. A chain 50 suitably couples the gear 48 with the gear or gears 52 of rear wheel 24.

Figure 4:
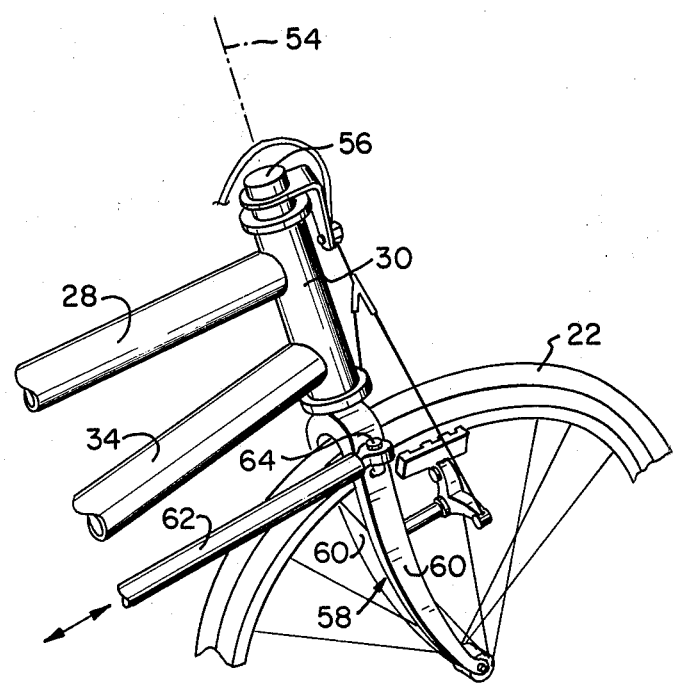
FIG. 4 shows a perspective view, partially cut away of the front portion of the embodiment of FIG. 1.

As generally shown in FIG. 1 and in greater detail in FIG. 4, the front wheel portion of the frame 10 is supported by the front wheel 22 such that the wheel 22 is capable of being turned with respect to the frame about the turning axis 54 which extends through the general plane of the wheel. More particularly, head tube 30 of the frame 10 rotatably supports the front axle 56 about the axis 54. Axis 56 is fixedly secured to the forked yoke 58 which includes the forks 60 disposed on opposite sides of and are secured to the axle of wheel 22 so that the latter is free to rotate between the forks. The forks are curved to provide a rake as well known in the art.

A linkage rod 62 is coupled at one end to the forked yoke 58 so that motion of the rod along its elongated axis causes yoke 58 and axle 56 to rotate relative to head tube 30 about axis 54. Preferably, the rod 62 is connected to the yoke 58 with a pivoting pin 64. The latter is oriented parallel to and spaced from axis 54 so that motion of rod 62 substantially along its elongated axis in one direction causes the wheel to turn in one direction, and motion of rod 62 in the opposite direction causes the wheel to turn in the opposite direction. The opposite end of rod 62 is suitably coupled to the handle bars 20 so that the rod can be selectively moved along its axis in one of the two directions responsively to turning the handle bars 20 about its steering axis in a corresponding one of two directions, as will be more apparent hereinafter.

Figure 2:
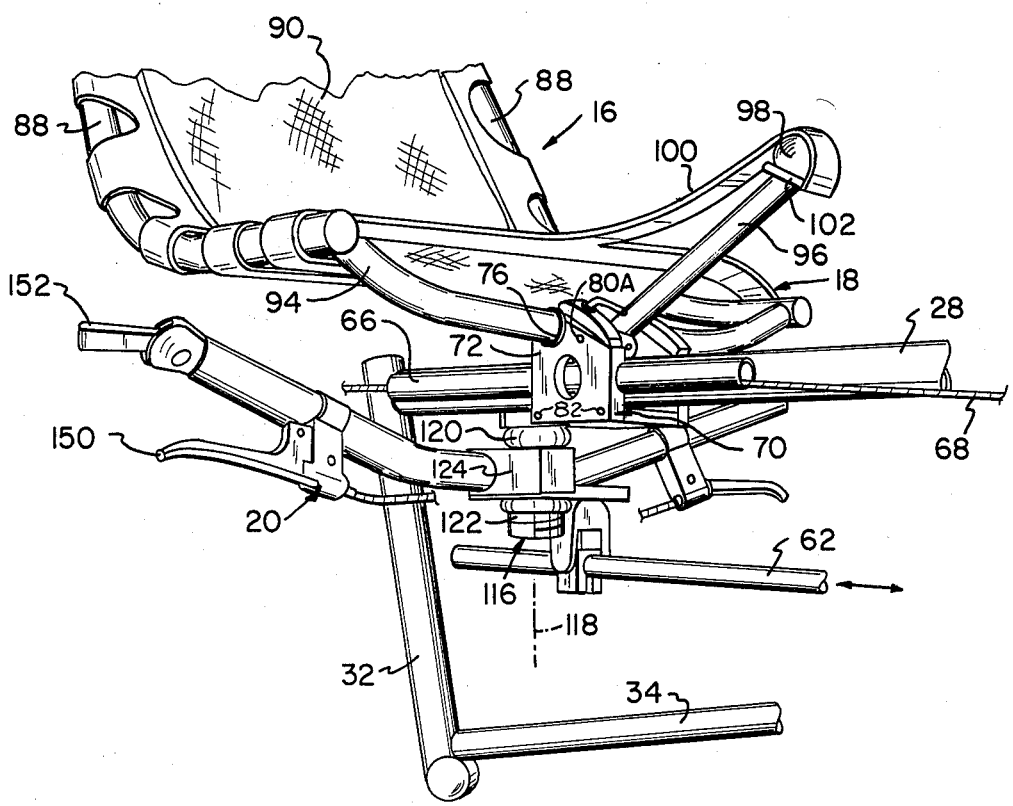
FIG. 2 shows a perspective view, partially cut away of the carriage unit of the embodiment of FIG. 1 mounted on the frame.
Figure 3:
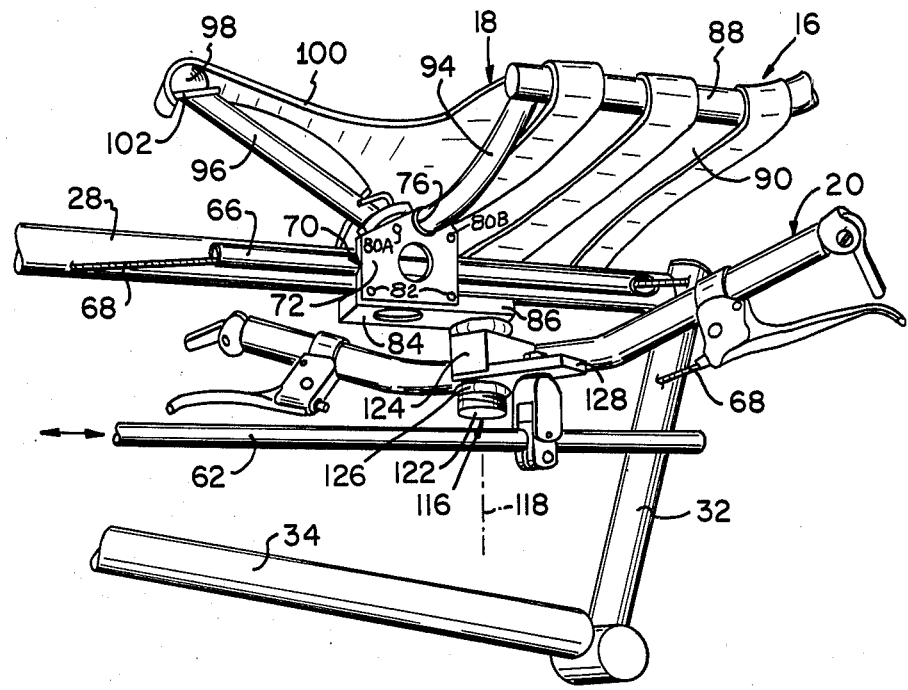
FIG. 3 shows a second perspective view, partially cut away of the carriage unit of the embodiment of FIG. 1, mounted on the frame.
Figures 5, 6:
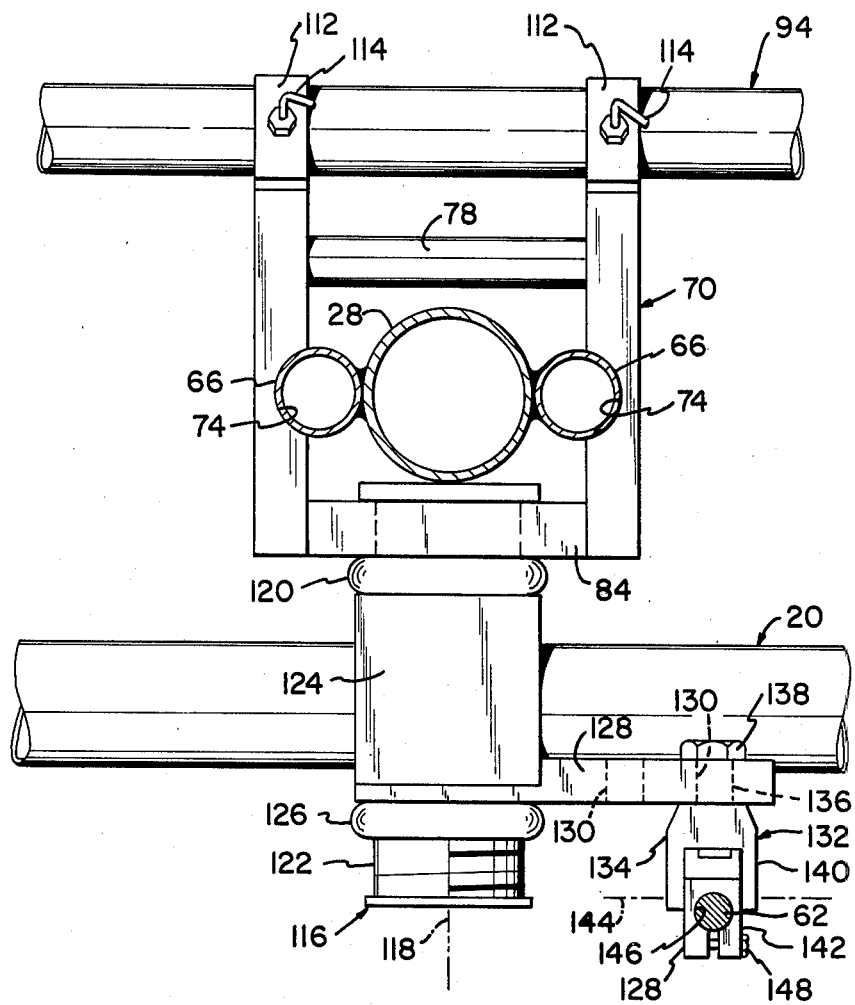
FIG. 5 shows a cross-sectional view, partially cut away, taken through the frame of the embodiment of FIG. 1, and viewing the carriage unit.
FIG. 6 shows a detail view, partially cut away of the seat attached to the rear portion of the frame.

As best shown in FIGS. 2 and 3 the adjustable carriage unit 16 including seat assembly 18 and handle bars 20 is mounted for movement on the frame 10 and rod 62 toward and away from the foot pedals 26 so as to accommodate various sized riders. More particularly, as generally shown in FIG. 1 and in detail in FIGS. 2, 3 and 5 a pair of ways 66 are respectively secured, such as by welding, to opposite sides of top tube 28. As will be more apparent hereinafter, ways 66 provide additional support for carriage unit 16 as well as conduits for the rear brake and gear transmission control cables generally referred to at 68. Carriage unit 16 includes the carriage mounting assembly 70 for supporting both the seat assembly 18 and handle bars 20 and for mounting the carriage unit 16 to frame 10. Assembly 70 includes a pair of side plates 72, each being formed on its inner surface with a groove 74 (best shown in FIG. 5) for mating in a snug relationship with one of the ways 66, and a notch 76 (best shown in FIGS. 2 and 3) in its upper edge. The plates 72 are secured together on opposite sides of the top tube 28 of frame 10 and ways 66 by front and rear support bars 78 (one of which is shown in FIG. 5) which preferably extend substantially parallel to one another above the tube 28 and ways 66 and are connected to the plates with respective Allen screws 80A and 80B. The plates 72 are also secured with Allen screws 82 to opposite sides of a bottom plate 84. The latter has an extending portion 86.

The seat assembly 18 of carriage unit 16 includes a frame having a pair of side tubes 88 suitably bent so that a suitable material can be secured between the side tubes to form the seat 90. A back cross tube 92 (shown in FIG. 1) and front cross tube 94 provide structural rigidity to the seat 90. A seat tension bar 96 is pivotally secured to and extends in a direction substantially perpendicular to the front cross bar 94. The end of bar 96 is provided with a spherical coupling member 98 and seat 90 includes a front extending portion 100 terminating in ring 102 secured on bar 96 by member 98 so that when the rider sits in seat 90, rod 96 pivots in a downward direction from the weight of the rider providing additional tension in the seat. As shown in FIG. 1, the tops of side tubes 88 are each pivotally connected (by any suitable means such as a pivot bracket 104) to one end of a back support rod 106. Referring to FIG. 6, the latter has its opposite end connected for pivotal movement to a suitable supporting pin 108 provided on the outer side of each respective chain stay 44. Preferably, the end of each rod 106 is positioned on a respective pin 108 and removably held in place by any suitable means such as a cotter pin or the like. Again referring to FIG. 1, cross brace 110 is secured at opposite ends to support rods 106.

As shown in FIGS. 2, 3 and 5 suitable clamp means are provided for releasably securing the front cross tube 94 of the seat assembly 18 in each notch 76 of each plate 72 of the assembly 70. The clamp means preferably comprises a clamp 112 secured to an edge of each plate 72 with quick release means preferably in the form of an Allen screw 114, so that the clamp extends over the front cross tube 94 releasing securing the tube in notch 74 of respective plate 70.

The handle bars 20 are secured to the extension 86 of the bottom plate 84 of the assembly 70 by means of a steering axle or stubbed shaft 116 which defines the steering axis 118. Shaft 116 is swagged at its upper end 120 and screw threaded at its lower end 122. Handle bars 20 include center block 124 mounted on shaft 116 for pivotal movement about axis 118 by screwing screw thread ring 126 onto the end 122 of shaft 116 securing the block 124 between the swagged upper end 120 and the ring 126 at the lower end 122. A bracket 128 adapted to move with handle bars 20 about axis 118 is secured on shaft 116 between block 124 and ring 126 and extends to the side of frame 10 provided with linkage rod 62. Bracket 128 preferably includes two or more apertures 130, each spaced a different amount from steering axis 118. Suitable coupling means 132 secures rod 62 to bracket 128 at a predetermined spaced distance from steering axis 118 so that pivoting handle bars 20 about axis 118 moves rod 62 along its axis. As shown in FIG. 5 the coupling means 132 preferably comprises element 134 having a pivotal shaft 136 extending through one of the apertures 130 (depending upon the steering ratio desired) and pivotally secured in place with a nut 138. The opposite end of element 136 comprises yoke 140 for pivotally supporting the rod clamp 142 about the pivot axis 144 extending perpendicular to and in a horizontal plane with the rod 62. Clamp 142 includes an aperture 146 for receiving rod 62. Clamp 142 also includes bolt 148 for clamping the rod in the aperture 146. Handle bars 20 are provided with brake levers 150 and gear shift lever 152 which are suitably coupled through control cables 66 to the respective brakes and transmission gears as well known in the art.

The carriage unit 16 is easily adjustable by loosening screws 80 and 82 as well as bolt 148. This allows the mounting assembly 70 together with the seat assembly 18 and handle bars 20 to easily slide along the top tube 28 and the ways 66. As the carriage unit slides the rear rods 106 of the unit freely rotate at their top ends in brackets 104 and at their bottom end about the supporting pins 108 provided on the chain stays 44. When the carriage unit is positioned at the desired relative location relative to foot pedals 26, i.e. seat assembly 18 is at the desired spacing from the foot pedals, the carriage unit can easily be locked in position for tightening the screws 78 and 80. This secures the assembly 70 to the top tube 28 and the ways 64, and the bolt 148 secures the clamp 142 to the linkage rod 62. This arrangement provides a universal sized recumbent bicycle easily adjustable to accommodate most riders. It is noted that regardless of the position of the seat assembly 18, the handle bars 20 will be directly below.

In addition the seat assembly can be easily folded by removing the pins holding the rear supporting rods 106 of the carriage unit 16 to the pins 108 of chain stays 44. Loosening clamps 112, enables the seat to pivot forward in notches 74 about the front cross bar 94. In addition to this step the unit can be removed when transporting or storing the bicycle simply by further loosening screws 114 so as to loosen each clamp 112 so that the front cross bar 94 of the seat assembly can be removed from the notches 74.

The steering ratio with respect to the amount of turning of the handle bars required to turn the front wheel 22 can be easily adjusted by repositioning the shaft 136 of coupling means 132 in a different aperture 130 of the bracket 128. The closer the aperture 130 is to the steering axis the less sensitive the steering is, i.e., the greater the handle bars 20 must be turned about steering axis 118 in order to turn the front wheel a specified amount.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A recumbent bicycle including a bicycle frame, a front wheel rotatable about a turning axis, a rear wheel and drive means including foot pedals for driving said rear wheel, the improvement comprising
    a carriage unit including (1) a seat assembly and (2) handle bars rotatable about a steering axis and coupled to said front wheel so that movement of said handle bars about said steering axis causes said front wheel to rotate about said turning axis, said carriage unit being mounted on said frame so as to be adjustably movable toward and away from said foot pedals in order to accommodate various sized riders.

2. A bicycle according to claim 1, wherein said frame includes a front portion, a rear portion and at least one elongated element extending therebetween; and said carriage unit includes a mounting assembly for adjustably mounting said carriage unit to said elongated element so that said mounting assembly together with said seat assembly and handle bars are movable along said element toward and away from said foot pedals.

3. A bicycle according to claim 2, further including a pair of ways secured to opposite sides of said element providing conduits for control cables and for supporting said carriage unit, said mounting assembly being mounted to said element and said ways.

4. A bicycle according to claim 2, wherein said seat assembly and said handle bars are each secured to said mounting assembly.

5. A bicycle according to claim 4, wherein said seat assembly comprises a seat frame having a cross bar, and said mounting assembly includes a pair of side plates adjustably connected to said elongated element, a notch formed in the upper edge of each of said side plates, and clamp means for clamping said cross bar in said notch of each of said plates.

6. A bicycle according to claim 5, wherein said seat assembly further includes elongated rear supports each being pivotally secured at one end to said seat frame and at the other end to said bicycle frame so as to allow said unit to move relative to said bicycle frame.

7. A bicycle according to claim 4, wherein said mounting assembly includes a pair of side plates and means for releasably securing said plates together so as to clamp said elongated element therebetween.

8. A bicycle according to claim 4, further including linkage means for coupling said handle bars to said front wheel so that movement of said handle bars about said steering axis causes said front wheel to rotate about said turning axis.

9. A bicycle according to claim 8, wherein the steering ratio between rotation of said handle bars about said steering axis relative to rotation of said wheel about said turning axis is adjustable.

10. A bicycle according to claim 8, wherein said linkage means comprises an elongated element connected at one end to said front wheel, and at a spaced position to said handle bars at a location spaced from the steering axis.

11. A bicycle according to claim 10, wherein the location of said spaced position is adjustable.

12. A bicycle according to claim 1, wherein said handle bars are mounted with respect to said seat assembly so that the position of said handle bars relative to said seat assembly remain substantially fixed regardless of the relative position of said carriage unit to said foot pedals.

13. A bicycle according to claim 1, wherein said seat assembly includes a seat and means for tensioning said seat.

14. A recumbent bicycle comprising:
 a frame including front and rear portions and an elongated element extending between said front and rear portions;
 a rotatable front wheel for supporting the front portion of the frame and capable of being turned with respect to the frame about a turning axis extending through the general plane of the front wheel;
 a rotatable rear wheel for supporting the rear portion of said frame;
 means including handle bars for turning said front wheel about said turning axis;
 drive means for rotatably driving said rear wheel so that said rear wheel rotates about its rotation axis, said drive means including foot pedals mounted for movement with respect to said frame;
 a carriage unit including said handle bars and a seat assembly for supporting the rider of said bicycle, said carriage unit being mounted on said frame and adjustably movable along at least a portion of said elongated element between the rear portion and the front portion of said frame so that the seat assembly and handle bars are adjustably movable toward and away from said foot pedals in order to accommodate different sized riders.

15. A recumbent bicycle according to claim 14, wherein said carriage unit includes a mounting assembly, said mounting assembly comprising a pair of side plates for clamping said elongated element therebetween.

16. A recumbent bicycle according to claim 15, wherein said seat assembly comprises a cross element, said bicycle further including clamp means for releasably clamping said cross element to said mounting assembly.

17. A recumbent bicycle according to claim 16, further including means for pivotally mounting said handle bars to said mounting assembly so that said handle bars are pivotally movable about a steering axis.

18. A recumbent bicycle according to claim 17, further including linkage means for coupling said handle bars to said front wheel.

19. A recumbent bicycle according to claim 18, wherein said linkage means comprises an elongated element pivotally coupled to said front wheel at a point spaced from said turning axis and pivotally coupled to said handle bars at a point spaced from said steering axis.

* * * * *

UNITED STATES PATENT AND TRADEMARK OFFICE
CERTIFICATE OF CORRECTION

PATENT NO. : 4,283,070
DATED : August 11, 1981
INVENTOR(S) : Richard Forrestall & David Gordon Wilson It is certified that error appears in the above-identified patent and that said Letters Patent are hereby corrected as shown below:

Assignee: Fomac, Inc., Wilmington, Mass.

Signed and Sealed this

Twentieth Day of October 1981

[SEAL]

*Attest:*

GERALD J. MOSSINGHOFF

*Attesting Officer*

*Commissioner of Patents and Trademarks*